United States Patent [19]
Komatsu

[11] Patent Number: 5,594,585
[45] Date of Patent: Jan. 14, 1997

[54] VEHICLE MIRROR

[75] Inventor: Toru Komatsu, Shimada, Japan

[73] Assignee: Murakami Kaimeido Co., Ltd., Japan

[21] Appl. No.: 490,073

[22] Filed: Jun. 13, 1995

[30] Foreign Application Priority Data

Jun. 29, 1994 [JP] Japan .................... 6-168582

[51] Int. Cl.$^6$ .................... B60R 1/06; G02B 7/182; H05B 3/84
[52] U.S. Cl. .................... 359/512; 359/884
[58] Field of Search .................... 359/507, 509, 359/512, 883, 884

[56] References Cited

U.S. PATENT DOCUMENTS

| | | | |
|---|---|---|---|
| 3,895,155 | 7/1975 | Shukuri et al. | 359/507 |
| 4,410,790 | 10/1983 | Berg et al. | 219/219 |
| 4,634,242 | 1/1987 | Taguchi et al. | 350/588 |
| 4,940,317 | 7/1990 | Reuben | 350/588 |
| 5,039,492 | 8/1991 | Saaski et al. | 359/839 |
| 5,155,625 | 10/1992 | Komatsu et al. | 359/512 |
| 5,273,812 | 12/1993 | Oguchi et al. | 428/220 |
| 5,418,643 | 5/1995 | Ogasawara et al. | 359/507 |

*Primary Examiner*—Timothy P. Callahan
*Assistant Examiner*—My-Trang Nu Ton
*Attorney, Agent, or Firm*—Hedman, Gibson & Costigan, P.C.

[57] ABSTRACT

A vehicle mirror has a mirror housing and a mirror assembly provided in the mirror housing. The mirror assembly includes a glass substrate and a reflecting film made of chromium or aluminum and formed on the back surface of the glass substrate. A panel heater is bonded by adhesive to the back surface of the reflecting film. A hydrophilic film is formed on the front surface of the glass substrate. The hydrophilic film is made of a hydrophilic oxide film such as $SiO_2$ and functions to spread a waterdrop deposited on the mirror surface in the form of a thin water film.

10 Claims, 4 Drawing Sheets

VEHICLE MIRROR

BACKGROUND OF THE INVENTION

This invention relates to a vehicle mirror such as a fender mirror and a door mirror and, more particularly, to a vehicle mirror with an improved waterdrop prevention property.

When a waterdrop is formed on an outer mirror, e.g., a fender mirror or a door mirror, while a vehicle is running in the rain, visibility of a rear view thereby is reduced with the result that safety of driving is impaired. Therefore, for removing a waterdrop formed on the vehicle mirror, the following methods have been proposed in the past:

(a) A cleaning agent (surfactant or a washer liquid) is sprayed or otherwise applied on the surface of an outer mirror to remove a waterdrop and dust deposited on the surface of the outer mirror (e.g., Japanese Utility Model Publication No. 47-34209).

(b) An anti-fog film (water absorption film) made of an organic material is attached to the surface of an outer mirror.

(c) A heat generating means is provided on the back of an outer mirror to evaporate a waterdrop formed on the surface of the outer mirror (Japanese Utility Model Publication No. 51-45803).

(d) An ultrasonic vibrator and a heat generating member are provided on the back of an outer mirror to scatter and evaporate a waterdrop deposited on the outer mirror.

The proposed method (a) using a cleaning agent is inconvenient because a period of time during which a waterdrop is eliminated is relatively short and, therefore, the cleaning agent must be applied frequently. The proposed method (b) using an anti-fog film has the disadvantage that the anti-fog film is susceptible to scratches and has a poor heat-resisting property because it is made of an organic film. Moreover, adhesive used for attaching the film causes diffusion of light with the result that glaring of an image occurs at night and contrast of an image is adversely affected in the daytime. Furthermore, if wetting property of the film decreases even slightly, it becomes difficult to recover sufficient visibility.

The proposed method (c) using a heat generating means for evaporation of a waterdrop usually takes seven to ten minutes for evaporating a waterdrop deposited on the outer mirror and hence is not practical. The proposed method (d) using an ultrasonic vibrator and a heat generating member requires a complex device and a large number of component parts which inevitably results in a high manufacturing cost.

It is, therefore, an object of the invention to provide a vehicle mirror capable of obtaining a sufficient and durable waterdrop removal effect with a simple structure.

SUMMARY OF THE INVENTION

For achieving the above described object of the invention, a vehicle mirror according to the invention has a hydrophilic film permanently formed on the front surface thereof.

According to the invention, a waterdrop formed on the mirror surface tends to spread in the form of a thin water film and, therefore, a lens effect produced by the waterdrop is mitigated and decrease in visibility is thereby mitigated notwithstanding that water stays on the mirror surface. Besides, since water spreads in the form of a thin water film, an area of contact between water and air increases with a result that water deposited on the mirror surface evaporates easily. Since there is no flow away of a cleaning agent, the water removing effect is durable. Moreover, the structure required for obtaining this effect is simple and inexpensive.

In one aspect of the invention, the hydrophilic film consists of an oxide film.

According to this aspect of the invention, since a film made of an oxide can easily produce an OH group which is a hydrophilic group, an excellent hydrophilic property can be obtained.

In another aspect of the invention, is a film made of $SiO_2$.

According to this aspect of the invention, $SiO_2$ thin film generally has a lower refractivity than a glass substrate and therefore has a refractivity resembling water or air, so that surface reflection is at a low level and a double image hardly takes place. For this reason, diffused reflection hardly takes place when a rain drop is deposited on the mirror whereby a good visibility can be enjoyed. Besides, since the film is made of an inorganic material, the film has high resistivity to scratches and heat and also has high durability and weather-proof property.

In another aspect of the invention, the hydrophilic film has a porous surface.

According to this aspect of the invention, a wetting property based on a capillary phenomenon is improved whereby a hydrophilic property, and hence a waterdrop removal property, is enhanced.

In another aspect of the invention, the hydrophilic film has thickness of 1,000Å or over.

According to this aspect of the invention, a sufficiently porous film can be formed and a sufficiently improved hydrophilic property can thereby be obtained.

In another aspect of the invention, the mirror comprises a glass substrate having a reflecting film formed on the back surface thereof and the hydrophilic film is formed on the front surface of the glass substrate.

According to this aspect of the invention, a waterdrop removal effect can be obtained with a simple and inexpensive structure.

In another aspect of the invention, the hydrophilic film has a lower refractivity than the glass substrate.

According to this aspect of the invention, surface reflection is reduced and occurrence of a double image can thereby be reduced.

In another aspect of the invention, the mirror has a substrate having a reflecting film formed on the front surface thereof and the hydrophilic film is formed on the surface of the reflecting film.

According to this aspect of the invention, the distance between the reflecting film and the hydrophilic film can be shortened and a double image can thereby be almost eliminated. Besides, since the reflecting film is protected by the hydrophilic film, injury of the reflecting film can be prevented notwithstanding that the reflecting film is disposed on the front surface of the substrate.

In another aspect of the invention, a heat generating member is laminated on the surface of the reflecting film.

According to this aspect of the invention, the mirror is heated by the heat generating member in a state where the waterdrop spreads in the form of a thin water film owing to the hydrophilic film and, accordingly, heat transfer efficiency to water deposited on the mirror surface is improved and water can thereby be evaporated in a short time and the waterdrop removal effect by the heat generating member can be enhanced.

In still another aspect of the invention, the reflecting film is made of a heat generating member.

According to this aspect of the invention, the structure of the mirror can be simplified.

Embodiments of the invention will be described below with reference to the accompanying drawings.

BRIEF DESCRIPTION OF THE DRAWINGS

In the accompanying drawings.

DESCRIPTION OF PREFERRED EMBODIMENTS

First Embodiment

Figure 1:
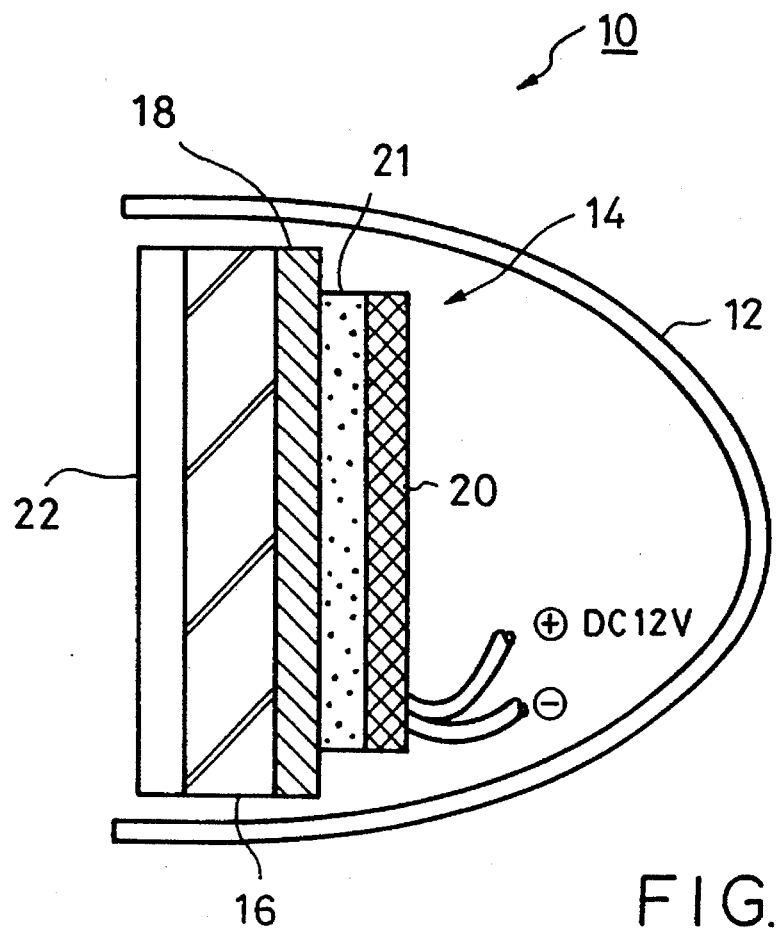
FIG. 1 is a sectional view showing a first embodiment of the invention.

FIG. 1 shows the first embodiment of the invention. A vehicle mirror 10 is constructed as an outer mirror (e.g., a fender mirror or a door mirror) of an automobile. The vehicle mirror 10 has a mirror housing 12 and a mirror assembly 14 provided in the mirror housing 12. The mirror assembly 14 includes a glass substrate 16 and a reflecting film 18 formed on the back surface of the glass substrate 15 and made of chromium or aluminum. On substantially the entire area of the back surface of the reflecting film 18 is bonded a panel heater 20 constituting a heat generating member by means of adhesive 21. As the panel heater 20, a PTC (positive temperature coefficient thermistor) panel heater, for example, may be employed and, in this case, the panel heater can be driven directly with an automobile battery power source so that no temperature control circuit is required. The PTC panel heater is constructed with, e.g., a high polymer panel heater imparted with the PTC characteristic (i.e., an electrically conductive resin provided with a silver or cupper electrode and laminated with a PET film).

A hydrophilic film 22 is formed by vapor deposition on the entire front surface of the glass substrate 16. The hydrophilic film 22 is made of a hydrophilic oxide film such as $SiO_2$. The hydrophilic film 22 is made of a film of a hydrophilic material having a waterdrop contact angle of, e.g., 40 degree or below and has a function to spread a waterdrop (e.g., rain drop) deposited on the film surface to a thin water film. By constructing the hydrophilic film 22 with a hydrophilic oxide film, an OH group which is a hydrophilic group is produced and this OH group imparts the hydrophilic property to the hydrophilic film 22.

Figure 2:
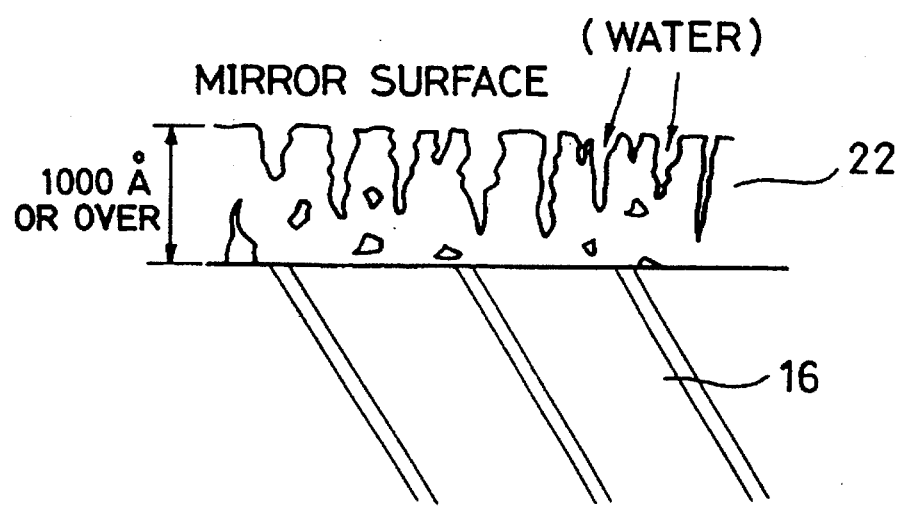
FIG. 2 is a sectional view showing a porous hydrophilic film.

By constructing the surface portion of the hydrophilic film 22 in a porous structure as shown in FIG. 2, wetting property of the surface of the film 22 is improved by reason of the capillary phenomenon and the hydrophilic property of the film 22 thereby is improved. By forming a film of $SiO_2$ by a PVD method such as ion plating or sputtering, such hydrophilic film 22 of a porous structure can be easily obtained. In this case, by forming the film with thickness of 1,000Å or over, a sufficiently porous structure can be obtained.

Figure 3A:
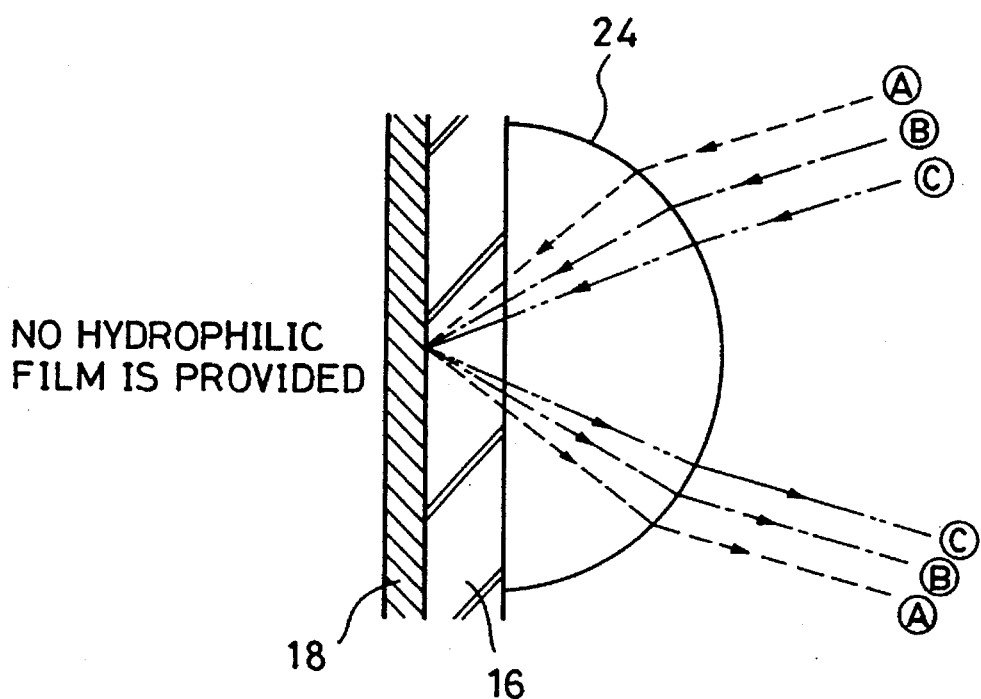
FIGS. 3A and 3B are views showing difference in behaviour of a deposited waterdrop depending upon presence or absence of a hydrophilic film.
Figure 3B:
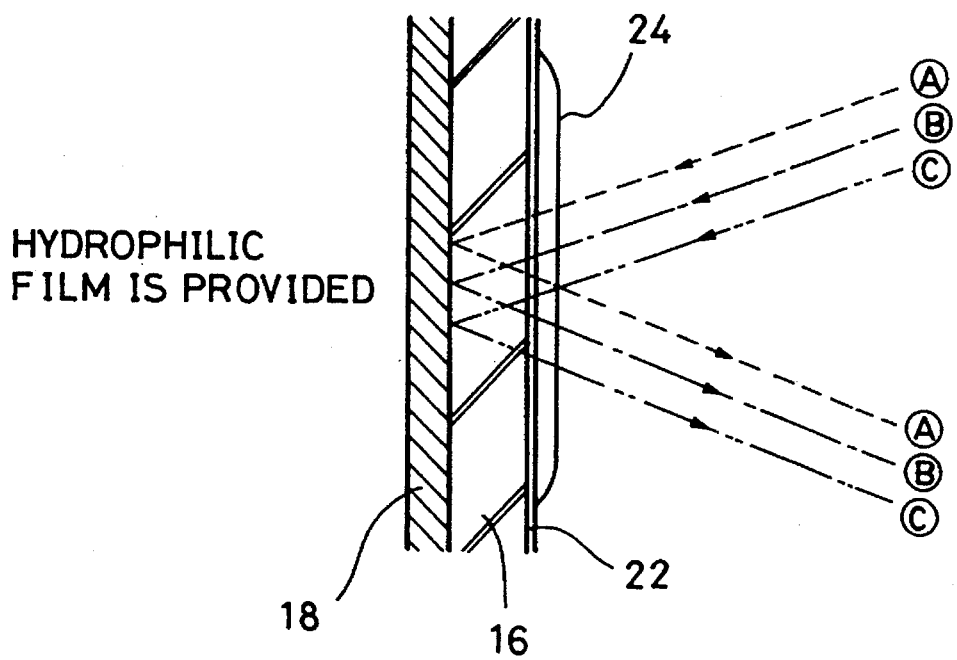

Difference in behaviour of a waterdrop deposited on the mirror surface between a case where a hydrophilic film is formed on the surface and a case where no such film is formed is shown in FIGS. 3A and 3B. FIG. 3A shows the case where no hydrophilic film is formed. A water drop 24 is deposited in the globular form on the water repellent mirror surface (i.e., the surface of the glass substrate 16). In this state, the waterdrop 24 is a small hemisphere having a small curvature and, therefore, an image behind the mirror is inverted due to the lens effect. This causes a bright image such as the sky and street lights to be reflected on the lower half of the waterdrop 24 and thereby makes it difficult to see such bright image.

In contrast, when the hydrophilic film 22 is formed as shown in FIG. 3B, the waterdrop 24 deposited on the mirror surface (the surface of the hydrophilic film 22) spreads in a thin film state. This makes it difficult to produce the lens effect and, therefore, decrease in visibility can be prevented notwithstanding that the waterdrop 24 is deposited on the mirror surface. Moreover, by such spreading of the waterdrop 24 in the form of a thin film, the area of contact between the waterdrop 24 and air increases and this enhances evaporation of water. These effects last permanently because the hydrophilic film 22 is rigidly fixed by vapor deposition to the mirror surface.

Figure 4:
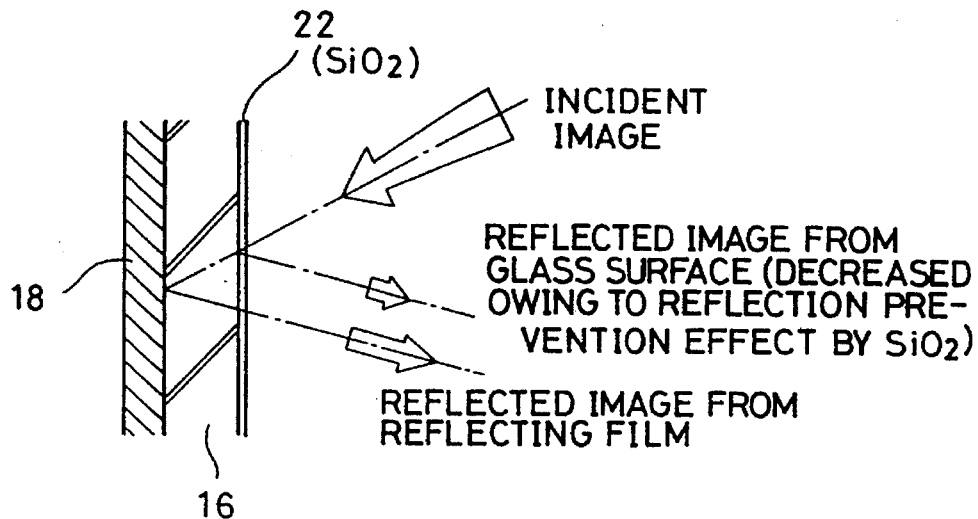
FIG. 4 is a view for explaining a reflection prevention effect obtainable when refractivity of the hydrophilic film made lower than refractivity of a glass substrate.

In the case of constructing the hydrophilic film 22 with $SiO_2$ which generally has a lower refractivity than the glass substrate (refractive indexes of glass, $SiO_2$ and water are 1.5, 1.4 and 1.3 respectively), $SiO_2$ functions as a film for preventing reflection and, therefore, reflection of an image on the surface of the glass substrate 16 is reduced as shown in FIG. 4 and visibility thereby is improved. Moreover, since the $SiO_2$ film is a thin film of an inorganic material, it has a high resistivity to scratches, durability and weather-proof property and therefore is suitable for use as the hydrophilic film in the present invention.

Figure 5:
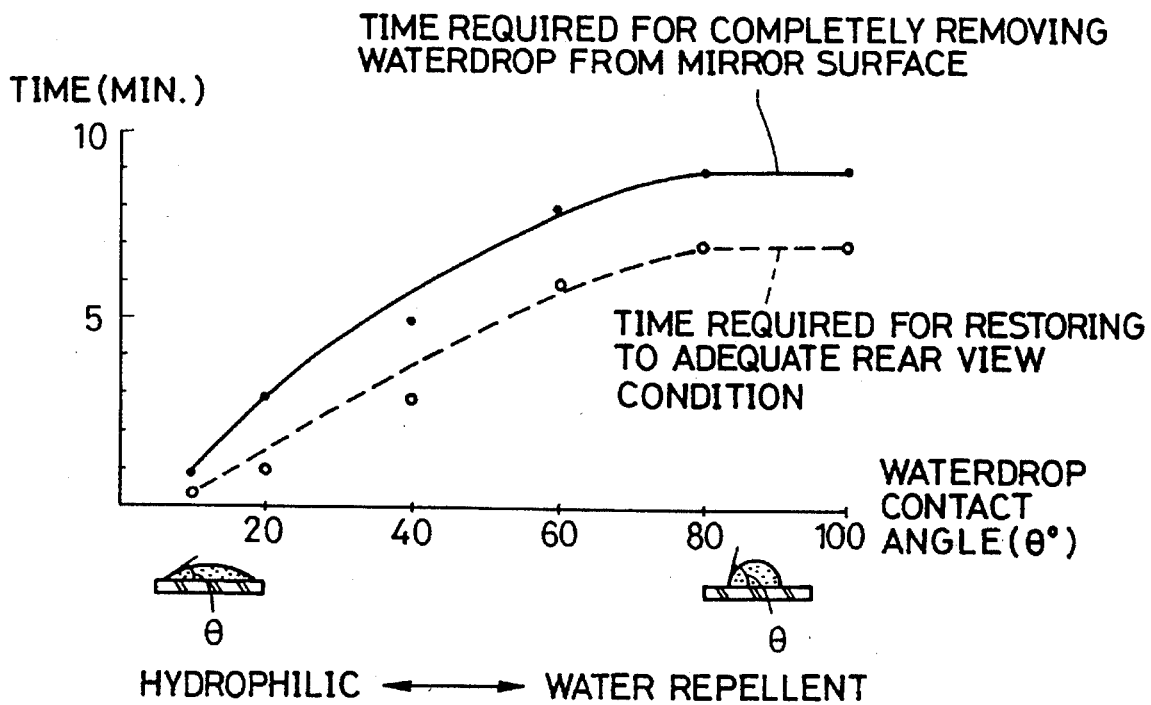
FIG. 5 is a graph showing difference in a waterdrop removal effect by a heat generating member depending upon difference in the hydrophilic property.

By forming the hydrophilic film 22 on the mirror surface, the waterdrop removal effect by the heat generating member 20 can be enhanced. FIG. 5 shows results of measurement of difference in waterdrop removal time depending upon difference in the hydrophilic property of the mirror surface under the condition that a heater input is set at 40 W (13.5 V, 3A). These results were obtained when the maximum amount of water was deposited on the mirror surface. In a case where the mirror surface is water repellent, the area of contact between the mirror surface and the waterdrop is reduced and, therefore, the efficiency of heat transfer from the mirror surface to the waterdrop is reduced and it takes a relatively long time for removing the waterdrop. In a case where the mirror surface is hydrophilic, the area of contact between the mirror surface and the waterdrop increases and, as a result, the heat transfer efficiency increases and water is removed (evaporated) in a relatively short time. From the standpoint of obtaining the combined effect of the hydrophilic film and the heat generating member, the hydrophilic film 22 can achieve the maximum effect if the waterdrop contact angle is 40 degrees or below.

Second Embodiment

Figure 6:
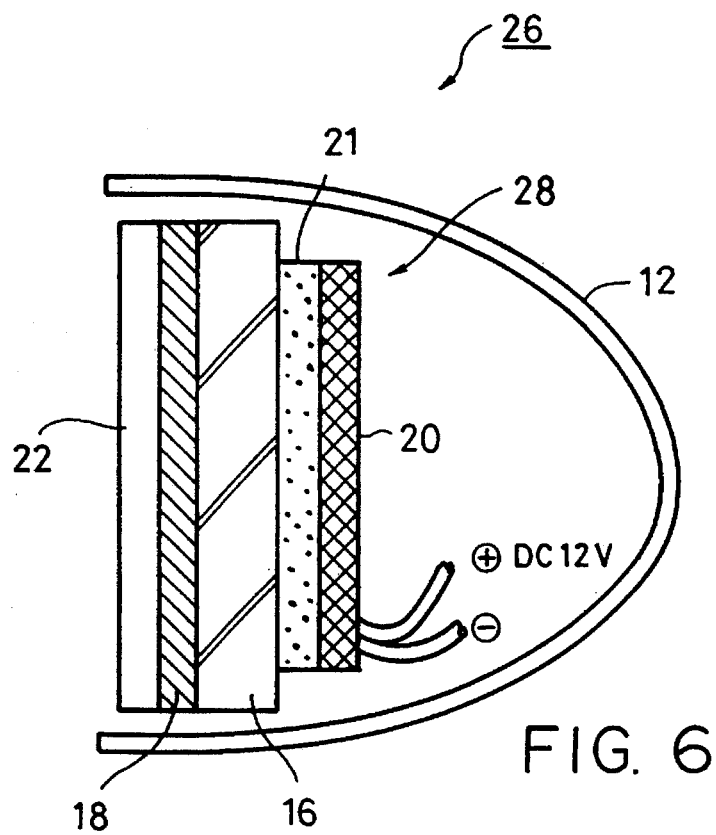
FIG. 6 is a sectional view showing a second embodiment of the invention.

A second embodiment is shown in FIG. 6. A vehicle mirror 26 has a reflecting film 18 formed on the front surface of a glass substrate 16. The vehicle mirror 26 has a mirror housing 12 and mirror assembly 28 provided in the mirror housing 12. The mirror assembly 28 includes a panel heater 20 which constitutes a heat generating member bonded by adhesive 21 on almost entire back surface of the glass substrate 16. The panel heater 20 is constructed, e.g., of a high polymer heat generating member.

On the entire front surface of the glass substrate 16 is formed a reflecting film 18 made of chromium or aluminum and a hydrophilic film 22 is formed on the reflecting film 18. The hydrophilic film 22 is made, e.g., of a hydrophilic oxide film such as $SiO_2$.

According to this structure, as in the first embodiment, an excellent water removal effect can be obtained by virtue of the function of the hydrophilic film 22 and further the combined function of the hydrophilic film 22 and the panel heater 20. Further, since the reflecting film 18 is disposed on the front surface of the glass substrate 16, the distance between the reflecting film 18 and the hydrophilic film 22 can be shortened whereby a double image occurring due to the surface of the hydrophilic film 22 and the reflecting film 18 can be made inconspicuous. Moreover, since the reflecting film 18 is covered with the hydrophilic film 22, injury on the reflecting film 18 can be prevented notwithstanding that the reflecting film 18 is disposed on the front surface of the glass substrate 16. Since light does not reach the substrate 16, the substrate 16 need not necessarily be made of glass but it may be made of a metal, plastic or other material.

Third Embodiment

Figure 7:
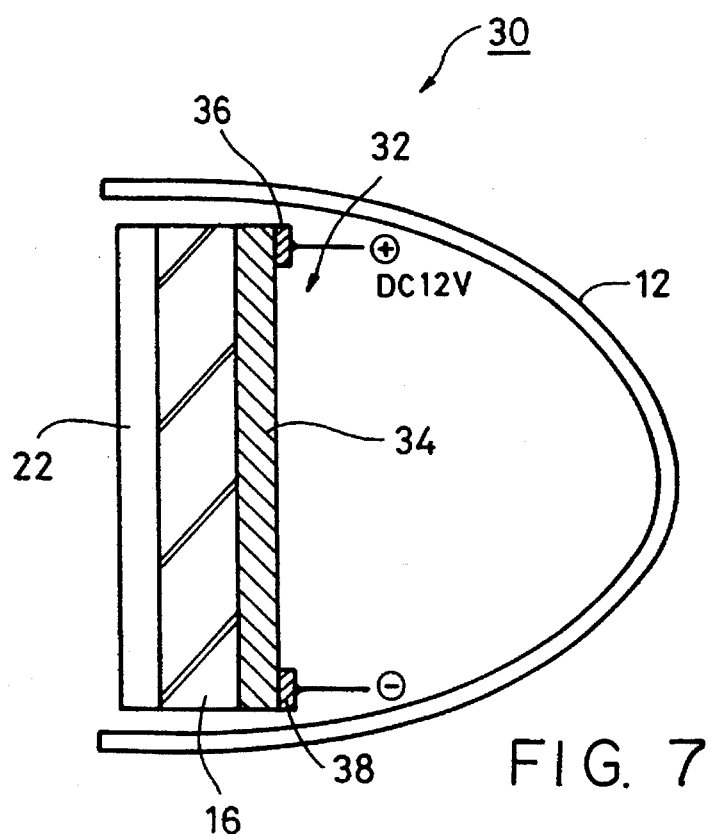
FIG. 7 is a sectional view showing a third embodiment of the invention.

FIG. 7 shows a third embodiment of the invention. In this embodiment, the reflecting film performs also a function of a heat generating member. A vehicle mirror 30 has a mirror housing 12 and a mirror assembly 32 provided in the mirror housing 12. The mirror assembly 32 includes a glass substrate 16 and a reflecting film and heat generator (thin film heater) 34 made of Ni—Cr alloy or titanium and formed on the entire back surface of the glass substrate 16. Electrodes 36 and 38 are provided at the upper and lower end portions of the reflecting film and heat generator 34.

A hydrophilic film 22 is formed on the entire front surface of the glass substrate 16. The hydrophilic film 22 is made of a hydrophilic oxide film such as $SiO_2$.

According to this embodiment, as in the first and second embodiments, an excellent waterdrop removal effect can be obtained owing to the function of the hydrophilic film 22 and, further, the combined function of the hydrophilic film 22 and the thin film heater 34. Further, since the reflecting film 34 serves also as the thin film heater, the structure of the mirror can be simplified.

In the above described embodiments, the hydrophilic film is made of $SiO_2$. The hydrophilic film may be made of other material. As other material, a material having a high light transmissivity (such as a hard inorganic material and a dielectric) in a visible region where absorption coefficient is small is desirable. Metal oxides such as $TiO_2$ and $Al_2O_3$ are preferable materials satisfying this condition.

In the above described embodiments, the hydrophilic film is formed on the mirror surface by vapor deposition. The hydrophilic film may also be formed by other method, e.g., applying a chemical treatment on the surface of the glass substrate and denature the surface to a hydrophilic film, or coating a hyrophilic material on the glass substrate.

This invention is applicable not only to an automobile mirror but also to mirrors of motorbikes and bicycles.

What is claimed is:

1. A vehicle mirror having a glass substrate, having a front and a back surface, a reflecting film formed on said back surface of said glass substrate, said front surface of said glass substrate being fully covered with a continuous hydrophilic inorganic oxide film, which is in contact with said glass substrate, said hydrophilic inorganic oxide film having a porous surface.

2. A vehicle mirror as defined in claim 1, wherein the inorganic oxide film has a lower refractivity than the glass substrate.

3. A vehicle mirror as defined in claim 1 wherein the inorganic oxide film is a film made of $SiO_2$.

4. A vehicle mirror as defined in claim 1 wherein a heat generating member is laminated on the surface of the reflecting film.

5. A vehicle mirror as defined in claim 1 wherein the reflecting film comprises a heat generating member.

6. A vehicle mirror wherein the mirror comprises a glass substrate having a reflecting film formed on the front surface thereof and said front surface of said glass substrate being fully covered with a continuous hydrophilic inorganic oxide film, which is in contact with said glass substrate, said hydrophilic inorganic oxide film having a porous surface.

7. A vehicle mirror as defined in claim 6 wherein the inorganic oxide film is a film made of $SiO_2$ and has a lower refractivity than the glass substrate.

8. A vehicle mirror as defined in claim 7 wherein the mirror has a substrate having a reflecting film formed on the front surface thereof, and the inorganic oxide film is formed on the surface of the reflecting film and a heat generating member is laminated on the surface of the reflecting film.

9. A vehicle mirror as defined in claim 6 wherein a heat generating member is laminated on the surface of the reflecting film.

10. A vehicle mirror as defined in claim 6 wherein the reflecting film is made of a heat generating member.

\* \* \* \* \*

REEXAMINATION CERTIFICATE (3664th)
United States Patent [19]
Komatsu

[11] B1 5,594,585
[45] Certificate Issued    Nov. 3, 1998

[54] VEHICLE MIRROR

[75] Inventor: Toru Komatsu, Shimada, Japan

[73] Assignee: Murakami Kaimeido Co., Ltd., Shizuoka, Japan

Reexamination Request:
No. 90/004,917, Feb. 17, 1998

Reexamination Certificate for:
Patent No.: 5,594,585
Issued: Jan. 14, 1997
Appl. No.: 490,073
Filed: Jun. 13, 1995

[30]   Foreign Application Priority Data

Jun. 29, 1994   [JP]   Japan ..................... 6-168582

[51] Int. Cl.$^6$ ............. B60R 1/06; G02B 7/182; H05B 3/84
[52] U.S. Cl. ............................ 359/512; 359/884

[56]    References Cited

FOREIGN PATENT DOCUMENTS

A-63 00860   6/1986   Japan .
A- 61-286802   12/1986   Japan .
A-4328701   11/1992   Japan .
A-6270776   9/1994   Japan .

OTHER PUBLICATIONS

Aizaka, "Method of Vacuum Evaporation", Literature 1, pp. 1–4, Literature 2, pp. 1–2, Jun. 1987.

*Primary Examiner*—My-Trang Nu Ton

[57]    ABSTRACT

A vehicle mirror has a mirror housing and a mirror assembly provided in the mirror housing. The mirror assembly includes a glass substrate and a reflecting film made of chromium or aluminum and formed on the back surface of the glass substrate. A panel heater is bonded by adhesive to the back surface of the reflecting film. A hydrophilic film is formed on the front surface of the glass substrate. The hydrophilic film is made of a hydrophilic oxide film such as $SiO_2$ and functions to spread a waterdrop deposited on the mirror surface in the form of a thin water film.

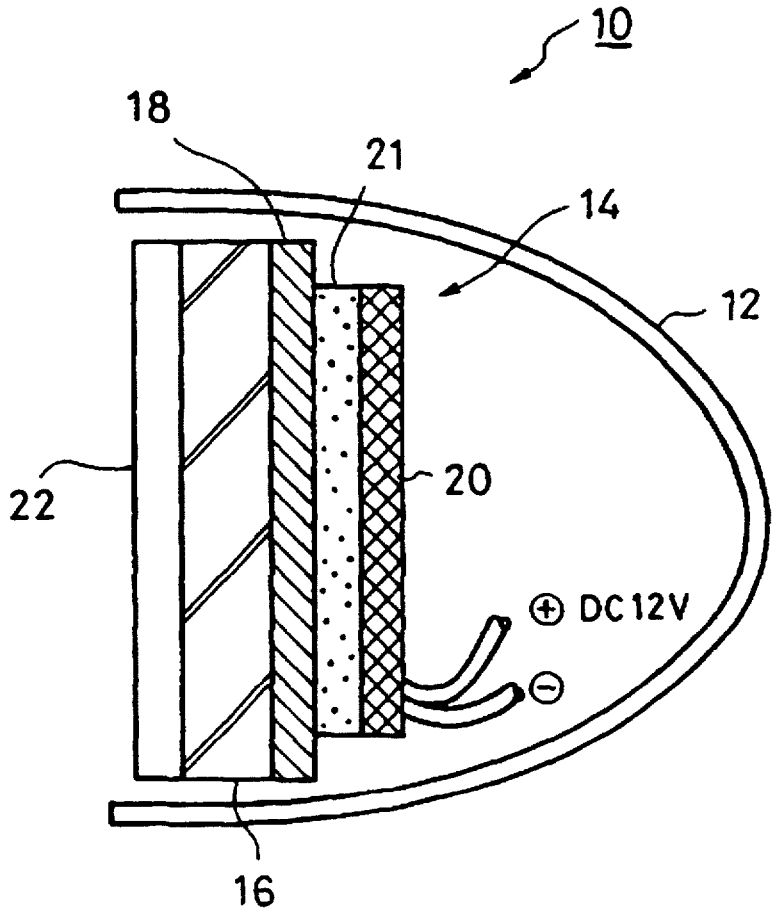

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–10 is confirmed.

* * * * *